Oct. 18, 1932.  R. H. ANDERSON.  1,882,711
SHAPING MACHINE
Filed Dec. 29, 1930  2 Sheets-Sheet 1

INVENTOR
ROBERT H. ANDERSON
BY W. B. Bowman
ATTORNEY

Oct. 18, 1932.  R. H. ANDERSON  1,882,711

SHAPING MACHINE

Filed Dec. 29, 1930  2 Sheets-Sheet 2

INVENTOR
ROBERT H. ANDERSON
BY A. B. Bowman
ATTORNEY

Patented Oct. 18, 1932

1,882,711

UNITED STATES PATENT OFFICE

ROBERT H. ANDERSON, OF SAN DIEGO, CALIFORNIA, ASSIGNOR OF ONE-HALF TO A. B. BOWMAN, OF SAN DIEGO, CALIFORNIA

SHAPING MACHINE

Application filed December 29, 1930. Serial No. 505,216.

My invention relates to shaping machines, and the objects of my invention are:

First, to provide a shaping machine which eliminates the need of a templet in order to shape the edges or margins of a piece of material to be worked, the work itself being utilized for this function;

Second, to provide a shaping machine which, with the different shaped cutting tools, is adapted to perform an infinite number of various shaping operations, and to produce practically any desired effect upon the material worked;

Third, to provide a shaping machine which is particularly adapted to form raised sign characters in which the background is formed integrally with the face;

Fourth, to provide a shaping machine in which the table is adapted to support the work and may be readily dropped from its upper position and brought again to its normal position without disturbing its adjustment, thus facilitating the use of the shaping tool within enclosures;

Fifth, to provide in conjunction with a shaping tool a shiftable stop whereby the edge of the work may be disposed in offset relation with the cutting tool;

Sixth, to provide a shaping machine which readily increases the speed with which the shaping may be accomplished without sacrificing accuracy;

Seventh, to provide a novel process of shaping the margins of articles, which requires but little skill for its execution;

Eighth, to provide a process of shaping the margins of articles which may be performed with rapidity, and which eliminates the use of expensive equipment for its execution; and Ninth, to provide on the whole a novelly constructed shaping machine, which is particularly simple of construction and of operation, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:—

Similar characters of reference refer to similar parts and portions throughout the several views of the drawings.

Figures 1, 2:
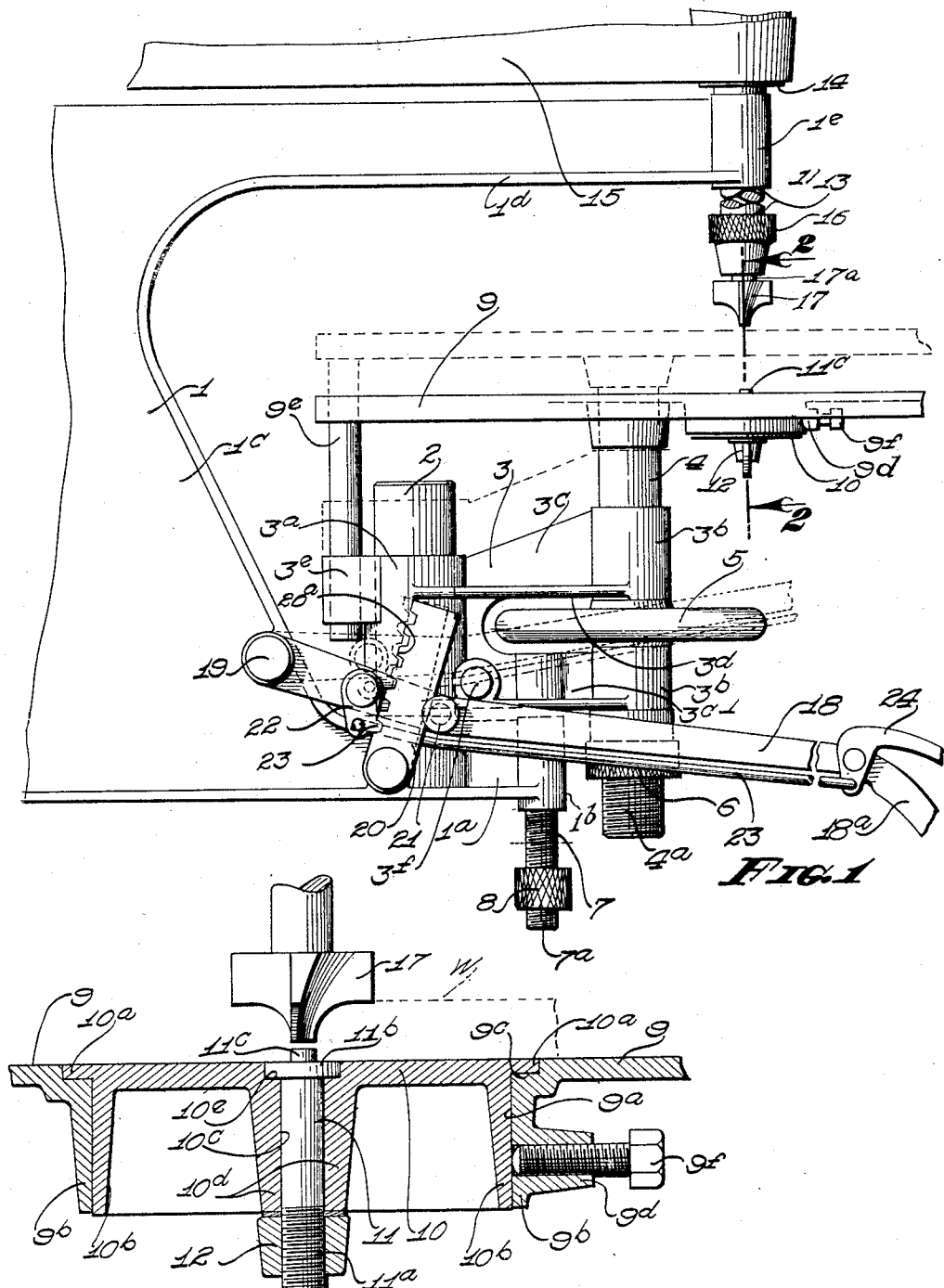
Figure 1 is a fragmentary side elevational view of my shaping machine.
Fig. 2 is an enlarged sectional view through 2—2 of Fig. 1, showing the table in its raised position with respect to the cutting tool.
Figure 3:
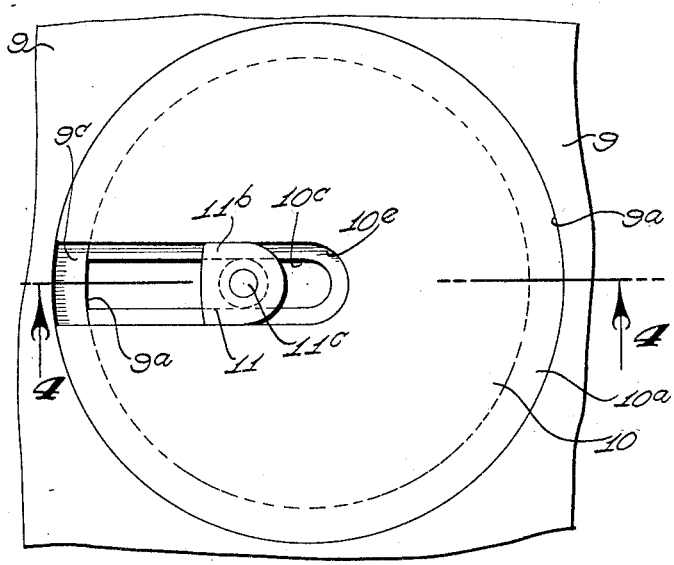
Fig. 3 is a fragmentary plan view of the table.

Frame 1, post 2, bracket 3, column member 4, adjusting wheel 5, stop collar 6, guide rod 7, stop collar 8, table 9, insert member 10, stop pin 11, wing nut 12, tool driving shaft 13, pulley 14, belt 15, chuck 16, cutting tool 17, lever 18, journal pin 19, catch bar 20, retainer pin 21, pawl 22, rod 23, and movable grip 24 constitute the principal parts and portions of my novel shaping machine.

A frame 1 is provided, from which extends a horizontally extending lower arm portion 1a. Extending upwardly from the arm portion 1a, near its extremity, is a post 2.

A bracket member 3 is provided, having a pair of parallel disposed sleeve portions 3a and 3b. The sleeve 3a is slidably mounted on the post 2. The sleeve 3b is arranged forwardly of the sleeve 3a, and is connected thereto by a web portion 3c. The sleeve 3b is bifurcated by a horizontally extending slot 3d cut into the bracket 3.

Slidably mounted in the sleeve 3b is a column member 4. The lower portion of the column member 4 is provided with screw threads 4a, upon which is mounted a hand adjusting wheel 5, which fits in the slot 3d, so that by turning in one direction or another, it shifts the column member 4 vertically with respect to the bracket 3. The lower end of the column member 4 protrudes from the sleeve 3b and is provided with a screw-threaded stop collar 6.

Extending downwardly from a boss on the web portion 3c, which connects the sleeves 3a and 3b, is a guide rod 7. The guide rod 7 fits into a guide sleeve 1b formed at the extremity of the lower arm portion 1a. The guide rod 7 is provided with screw threads 7a, which fit an internally threaded stop collar 8. The guide sleeve 1b and the guide rod 7 prevent rotation of the bracket 3 about the axis of the post 2.

Secured to the upper end of the column member 4 is a table 9, having a flat upper surface. At the rear portion of the table 9, there is provided a depending guide rod 9e which extends downwardly into a guide collar 3e, extending outwardly from the sleeve 3a.

A short distance forwardly of the collar member 4, the table 9 is provided with a circular opening 9a surrounded by a depending cylindrical wall 9b. The periphery of the opening 9a at the top of the table 9 is provided with a ledge 9c. The opening 9a is adapted to snugly receive a circular insert member 10, having a flange 10a at its upper portion, which fits and is supported on the ledge 9c. The flange 10a is of such a thickness that the surface of the insert member 10 is flush with the top of the table 9. The cylindrical wall, designated 10b, of the insert member is adapted to be engaged by a set screw 9f, which extends through a boss 9d, formed on the wall 9b.

The insert member 10 is provided with a slot 10c, which intersects the periphery thereof, and extends radially inwardly towards the center of the insert member. A depending wall 10d borders the slot 10c. A ledge 10e borders the slot 10c at the upper extremity thereof adjacent the upper surface of the insert member 10.

A stop pin 11 is provided, which comprises a shank portion 11a which extends downwardly through the slot 10c. A head portion 11b is formed at the upper extremity of the shank 11a. The head portion is in the form of a flange which is supported at opposite sides by the ledge 10e. The upper surface of the head portion 11b is flush with the top of the insert member 10; upwardly from the head portion 11b is a stop lug 11c, which is relatively small and of circular cross section. The lower end of the shank 11a extends below the cylindrical wall 10b and is adapted to receive a wing nut 12, which enables the stop pin 11 to be locked in any position along the slot 10c.

The frame 1, in addition to the lower arm portion 1a, is provided with an upright portion 1c, which is shown fragmentarily, at the upper portion of which is a fixed horizontally extending upper arm 1d. The extended end of the upper arm 1d is provided with a bearing 1e, having a vertically disposed axis coinciding with the axis of the insert member 10.

Journaled in the bearing 1e, is a tool driving shaft 13. Above the bearing 1e, the shaft 13 is provided with a pulley 14, shown fragmentarily, which may be driven by a belt 15, also shown fragmentarily. The belt is connected to a suitable driving means, such as an electric motor, not shown. The lower end of the tool driving shaft 13 is provided with a suitable chuck 16, which is adapted to receive the shank portion 17a of a cutting tool 17.

The cutter tool 17 is in the form of a cutter portion, the lower portion of which is adapted to generate a solid of revolution having a periphery adapted to cut the margins of the work to the desired shape.

In addition to the above-described means for vertically adjusting the table 9, namely, the column member 4 and adjusting wheel 5, there is provided an auxiliary mechanism which enables the table to be quickly lowered considerably and raised again to the previously set height. This is accomplished by a lever 18, which is attached at its rear end portion to a journal pin 19 supported in a suitable boss provided in the frame 1.

The lever 18 extends forwardly from the journal pin 19 to the forward side of the table 9, as shown in Fig. 1. The forward end of the lever 18 is provided with a hand grip 18a. Rotatably supported by the frame 1, in slightly offset relation to the lever 18, is a catch bar 20, which extends upwardly along the side of the lever 18, contiguous thereto. The lever 18 is held in such contiguous relation by the head portion of a retainer pin 21, which extends from the side of the lever 18. The rear side of the catch bar is provided with a plurality of teeth 20a, which are adapted to be engaged by a pawl 22 on the side of the lever 18 adjacent the rear side of the catch bar 20.

Attached to the lower or extended portion of the pawl 22, is a rod 23, which extends forwardly along the under side of the catch bar 20 to a point adjacent the grip portion 18a. At the extremity of the rod 23, there is attached a movable grip 24 in the form of a bell crank, as shown in Fig. 1.

Extending outwardly from the web portion 3c of the bracket 3, is a lug 3f. This lug is engaged by the upper side of the lever 18, so that upward movement of the lever causes a corresponding upward movement of the bracket 3, column 4, and table 9, without changing the adjustment of said column member, as shown by dotted lines in Fig. 1.

My process of forming or shaping articles is as follows: The article, which may be of wood, metal or any other material, is first cut to the requisite outline on a band saw or similiar tool.

If the edges of the article are to be shaped, the stop lug 11c of the stop pin 11 is positioned in axial alinement with the tool driving shaft 13, as shown in Fig. 2. It is preferred that this position of the stop pin 11 be at the inner extremity of the slot 10c, so that the stop pin may be centered accurately without difficulty. With the tool rotating, the article is moved inwardly against the cutter blades of the tool until its edge is in contact with the stop lug 11c. The article is then shifted with its edge remaining in contact with the stop lug. With the stop lug centered relative to the tool, it is immaterial which side of the lug is engaged, the cut made on the work will be the same, thereby facilitating rapid shaping of the margins of the work. It can thus be seen that the work or article itself forms the pattern or template for shaping its margins.

Figure 4:
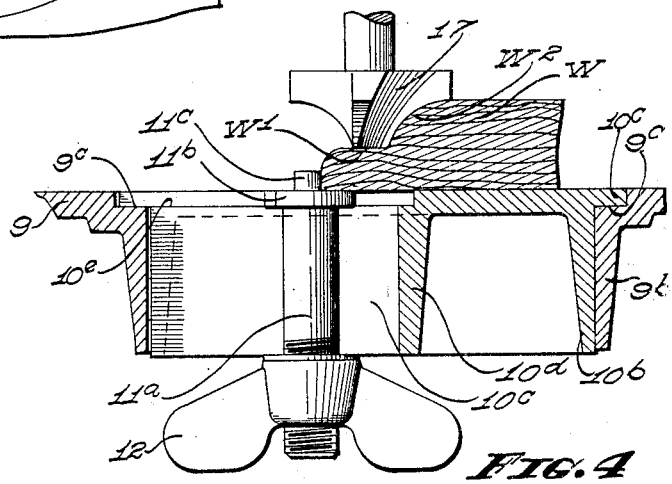
Fig. 4 is a fragmentary sectional view thereof through 4—4 of Fig. 3, which is at right angles to that shown in Fig. 2.
Figure 6:
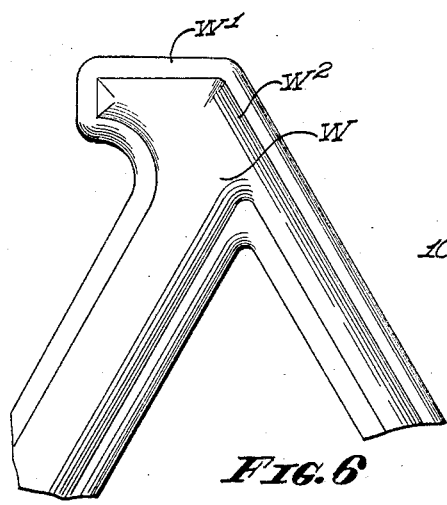
Fig. 6 is a fragmentary portion of a sign character as it appears when formed with my shaping machine.

With some types of work, it is desired to shape the work inwardly from its edge, as, for example, in forming a raised sign character with an integral background, as shown in Figs. 4, and 6. In such a case, the stop pin 11 is secured in an offset relation to the axis of the driving shaft 13, as shown in Fig. 4. The table is adjusted downwardly so that the lower edge of the tool clears the table the desired amount. The work is then moved inwardly until its edge engages the stop lug 11c, whereupon the cutting tool cuts a ledge, designated W1, and a rounded shoulder W2 of any desired curvature.

It is obvious that the tool cannot be moved in any further than desired, and a person, though having little experience with the machine, cannot ruin the work. Should he move the work or article inwardly in angular relation with a plane through the axes of the pin and tool, the tool does not cut in as far as otherwise; hence, the mistake can be easily corrected.

Figure 5:
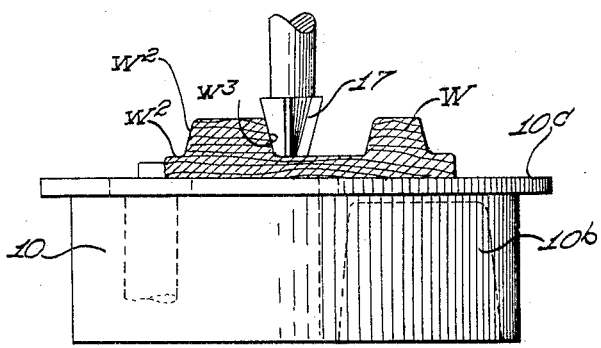
Fig. 5 is a side elevational view of the stop supporting insert member as viewed from the same direction as in Fig. 2, showing the stop member cutting tool shown in position for cutting within the margins of the work.

If it is desired to form a channel or groove W3, which is within the margins of the work, the stop pin 11 may be offset the desired amount; the work is then set into the cutter from the under side thereof until the cutter is operating at the desired depth. When thus set, the stop serves as a guide, and the edge of the work still serves as a pattern or template, as shown in Fig. 5.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a shaping machine, a table, a fixed arm extending thereover, a cutting tool revolubly supported by said fixed arm and depending therefrom, a guide stop means shiftable radially and revolubly relative to said cutting tool in said table arranged to be engaged by work undergoing shaping, and locking means for said stop means arranged to fix said stop means in axial alinement with said cutting tool or in offset relation therewith.

2. In a shaping machine, the combination with a fixed arm and a cutting tool revolubly supported thereby, of a table arranged under said cutting tool, a stop lug projecting above the surface of said table and shiftable radially and revolubly and arranged to be engaged by the edge of work undergoing shaping, and locking means for said stop lug arranged to fix said stop lug in axial alinement with said cutting tool or in offset relation therewith.

3. In a shaping machine, a fixed arm, a revoluble tool depending therefrom, a table under said tool, support means for said table, setting means for adjusting said table in relation to said tool, mechanism for quickly dropping said table below its set position and returning said table again to said set position without disturbing the adjustment of said setting means, an insert fitted into said table underneath said tool, said insert provided with a slot therein, a stop means adjustably mounted in said slot, said stop means including a stop lug protruding above said table, said stop lug arranged to be engaged by an edge of an article to be worked, and permit shifting of said edge therealong, said stop means being shiftable from a position of axial alinement with said tool to an offset relation therewith.

4. In a shaping machine, a fixed arm, a revoluble tool depending therefrom, a table under said tool, support means for said table, setting means for adjusting said table in relation to said tool, mechanism for quickly dropping said table below its set position and returning said table again to said set position without disturbing the adjustment of said setting means, an insert revolubly supported by said table, means for locking said insert, said insert provided with a slot therein, and a stop means adjustably mounted in said slot, said stop means including a stop lug protruding above said table, said stop lug arranged to be engaged by an edge of an article to be worked, and permit shifting of said edge therealong, said stop means being shiftable from a position of axial alinement with said tool to an offset relation therewith.

5. In a shaping machine, the combination with a fixed arm and a cutting tool revolubly supported in depending relation thereto, of a table arranged under said cutting tool, the central portion of said table concentric with said cutting tool revolubly mounted in said table, and a stop lug projecting above said revoluble portion of said table and shiftable radially in one direction only from the center thereof.

6. In a shaping machine, the combination with a fixed arm and a cutting tool revolubly supported in depending relation thereto, of a table arranged under said cutting tool, the central portion of said table concentric with said cutting tool revolubly mounted in said table, a stop lug projecting above said revoluble portion of said table and shiftable radially in one direction only from the center thereof, and means for locking said revoluble portion of said table and said shiftable lug in various rigid relations with said table and said tool.

7. In a shaping machine, the combination with a fixed arm and a cutting tool revolubly supported in depending relation thereto, of a table arranged under said cutting tool, the central portion of said table concentric with said cutting tool revolubly mounted in said table, a stop lug projecting above said revoluble portion of said table and shiftable radially in one direction only from the center thereof, means for locking said revoluble portion of said table and said shiftable lug in various rigid relations with said table and said tool, and means associated with said table for raising and lowering said table to certain predetermined adjusted positions.

In testimony whereof, I have hereunto set my hand at San Diego, California this 20th day of December, 1930.

ROBERT H. ANDERSON.